(12) United States Patent
Iwaguchi et al.

(10) Patent No.: US 11,465,317 B2
(45) Date of Patent: Oct. 11, 2022

(54) METHOD FOR MANUFACTURING OPTICAL FIBER

(71) Applicant: SUMITOMO ELECTRIC INDUSTRIES, LTD., Osaka (JP)

(72) Inventors: Noriaki Iwaguchi, Osaka (JP); Haruki Okuyama, Osaka (JP); Takahisa Yamaguchi, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 560 days.

(21) Appl. No.: 16/533,897

(22) Filed: Aug. 7, 2019

(65) Prior Publication Data

US 2020/0047378 A1 Feb. 13, 2020

(30) Foreign Application Priority Data

Aug. 10, 2018 (JP) .............................. JP2018-151213

(51) Int. Cl.
*B29C 35/08* (2006.01)
*G02B 6/44* (2006.01)
*G02B 6/12* (2006.01)

(52) U.S. Cl.
CPC ........ *B29C 35/0805* (2013.01); *G02B 6/4479* (2013.01); *B29C 2035/0827* (2013.01); *G02B 2006/12038* (2013.01); *G02B 2006/12069* (2013.01); *G02B 2006/12166* (2013.01)

(58) Field of Classification Search
CPC ........ B29C 35/0805; B29C 2035/0827; B29C 2035/2683; B29C 65/1406; B29C 65/1606; B29C 45/14549; B29C 2045/14557; B29C 45/14565; B29C 45/14614; B29C 45/14622; B29C 45/14631
See application file for complete search history.

(56) References Cited

U.S. PATENT DOCUMENTS 5,756,165 A * 5/1998 Ali ......................... C03C 25/26
427/178

FOREIGN PATENT DOCUMENTS

| JP | H09-278495 A | 10/1997 |
|---|---|---|
| JP | 2006-249265 A | 9/2006 |
| JP | 2009-274890 A | 11/2009 |
| JP | 2012-136401 A | 7/2012 |

* cited by examiner

*Primary Examiner* — Stella K Yi
(74) *Attorney, Agent, or Firm* — Faegre Drinker Biddle & Reath LLP

(57) ABSTRACT

A method for manufacturing an optical fiber includes: a coating step of forming a first layer by applying a first ultraviolet ray curable resin composition onto a glass fiber, and then, of forming a second layer by applying a second ultraviolet ray curable resin composition onto the first layer; a first irradiation step of curing the first layer and the second layer by irradiating the first layer and the second layer with an ultraviolet ray, and of obtaining the optical fiber including a primary resin layer and a secondary resin layer; and a second irradiation step of irradiating the optical fiber with an ultraviolet ray at an illuminance of less than or equal to one tenth of an illuminance in the first irradiation step for an irradiation time of longer than or equal to 10 times an irradiation time in the first irradiation step.

3 Claims, 3 Drawing Sheets

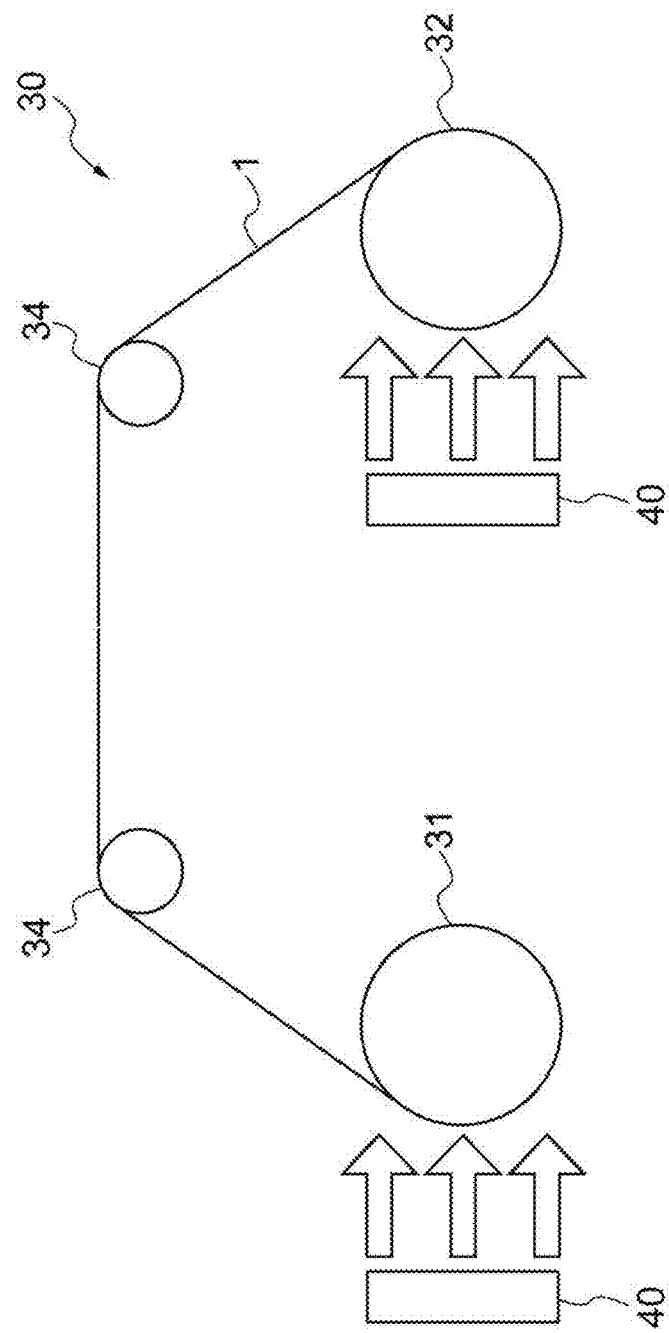

METHOD FOR MANUFACTURING OPTICAL FIBER

CROSS-REFERENCE TO RELATED APPLICATION

The present application is based upon and claims the benefit of the priority from Japanese patent application No. 2018-151213, filed on Aug. 10, 2018, which is hereby incorporated by reference in its entirety.

TECHNICAL FIELD

The present disclosure relates to a method for manufacturing an optical fiber.

BACKGROUND

JP2012-136401A discloses a resin coat optical fiber provided with a glass optical fiber including a core and a cladding, and a coating resin layer coating the glass optical fiber. The coating resin layer includes a primary layer and a secondary layer formed of an ultraviolet ray curable resin. The primary layer includes two layers of an inner layer and an outer layer. In the resin coat optical fiber, the fracture of the glass optical fiber is suppressed by increasing a Young's modulus of the inner layer.

JP2006-249265A discloses a liquid curable resin composition for coating an optical fiber. In a case where a coating film is formed on a glass fiber by this resin composition, it is possible to improve the strength of the glass fiber itself.

SUMMARY

A method for manufacturing an optical fiber according to one aspect of the present disclosure is a method for manufacturing an optical fiber including a glass fiber, a primary resin layer that coats an outer circumference of the glass fiber, and a secondary resin layer that coats an outer circumference of the primary resin layer, and the method includes: a coating step of forming a first layer by applying a first ultraviolet ray curable resin composition onto the glass fiber, and then, of forming a second layer by applying a second ultraviolet ray curable resin composition onto the first layer; a first irradiation step of curing the first layer and the second layer by irradiating the first layer and the second layer with an ultraviolet ray, and of obtaining the optical fiber including the primary resin layer and the secondary resin layer; and a second irradiation step of irradiating the optical fiber with an ultraviolet ray at an illuminance of less than or equal to one tenth of an illuminance in the first irradiation step for an irradiation time of longer than or equal to 10 times an irradiation time in the first irradiation step.

BRIEF DESCRIPTION OF THE DRAWINGS

The foregoing and other purposes, aspects and advantages will be better understood from the following detailed description of a preferred embodiment of the invention with reference to the drawings, in which:

FIG. 3 is a schematic view for describing an example of a second irradiation step.

DETAILED DESCRIPTION

Figure 1:
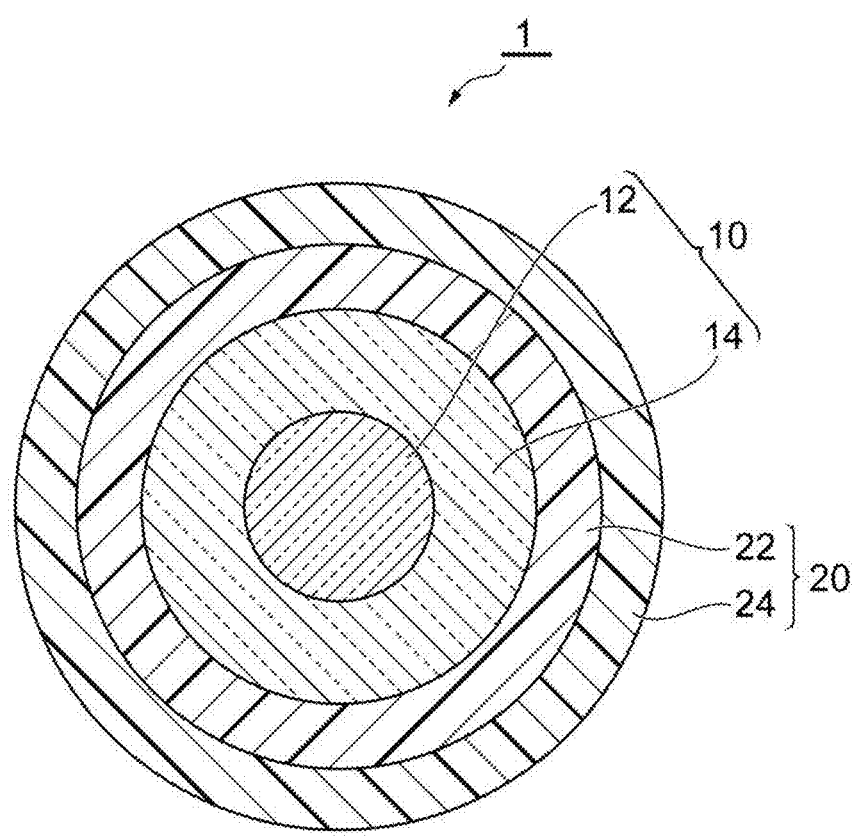
FIG. 1 is a sectional view illustrating a configuration of an optical fiber according to one embodiment.

Problem to be Solved by the Present Disclosure

As described above, in the case of using a specific resin composition, a manufacturing step tends to be complicated. Therefore, an object of the present disclosure is to provide a method for manufacturing an optical fiber in which it is possible to improve the strength of the optical fiber without using a specific resin composition.

Advantageous Effect of the Present Disclosure

According to the present disclosure, it is possible to provide a method for manufacturing an optical fiber in which it is possible to improve the strength of the optical fiber without using a specific resin composition.

Description of Embodiments of the Present Disclosure

First, embodiments of the present disclosure will be listed and described. A method for manufacturing an optical fiber according to an embodiment is a method for manufacturing an optical fiber including a glass fiber, a primary resin layer that coats an outer circumference of the glass fiber, and a secondary resin layer that coats an outer circumference of the primary resin layer, and the method includes: a coating step of forming a first layer by applying a first ultraviolet ray curable resin composition onto the glass fiber, and then, of forming a second layer by applying a second ultraviolet ray curable resin composition onto the first layer; a first irradiation step of curing the first layer and the second layer by irradiating the first layer and the second layer with an ultraviolet ray, and of obtaining the optical fiber including the primary resin layer and the secondary resin layer; and a second irradiation step of irradiating the optical fiber with an ultraviolet ray at an illuminance of less than or equal to one tenth of an illuminance in the first irradiation step for an irradiation time of longer than or equal to 10 times an irradiation time in the first irradiation step.

In the method for manufacturing an optical fiber according to the embodiment described above, the first irradiation step of irradiating an ultraviolet ray to the first layer and the second layer that are formed in the coating step, and obtaining the optical fiber is performed, and then, the second irradiation step of irradiating the optical fiber with an ultraviolet ray is further performed at an illuminance of less than or equal to one tenth of the illuminance in the first irradiation step for an irradiation time of longer than or equal to ten times the irradiation time in the first irradiation step. According to the inspection of the present inventors, it is known that it is possible to improve the strength of the optical fiber by the second irradiation step of emitting such weak light for a long period of time. Therefore, according to the method for manufacturing an optical fiber according to the embodiment described above, it is possible to improve the strength of the optical fiber without using a specific resin composition.

In one embodiment, the first irradiation step may be performed in an inert gas atmosphere, and the second irradiation step may be performed in an air atmosphere. In this case, it is possible to reliably improve the strength of the optical fiber.

In one embodiment, in the first irradiation step and the second irradiation step, ultraviolet ray light sources different from each other may be used. In this case, for example, it is possible to continuously perform the first irradiation step and the second irradiation step, and thus, it is possible to improve productivity.

In one embodiment, in the first irradiation step, the optical fiber that is obtained may be wound around a first bobbin, and the second irradiation step may be performed while the optical fiber is rewound between the first bobbin and a second bobbin. In this case, it is possible to irradiate the entire length of the optical fiber with an ultraviolet ray.

Detailed Description of the Embodiments of the Present Disclosure

Hereinafter, specific examples of a method for manufacturing an optical fiber according to an embodiment of the present disclosure will be described in detail with reference to the drawings. The present invention is not limited to such examples, but is represented by the claims, and includes meanings equivalent to the claims and all changes within the claims. In the following description, the same reference numerals will be applied to the same constituents in the description of the drawings, and the repeated description will be omitted.

(Optical Fiber)

FIG. 1 is a sectional view illustrating the configuration of an optical fiber according to one embodiment. In FIG. 1, a sectional surface that is perpendicular to a central axis direction of an optical fiber 1 (an optical axis direction) is illustrated. As illustrated in FIG. 1, the optical fiber 1 of this embodiment includes a glass fiber 10 that is an optical transmission medium, and a coating resin layer 20 that coats the glass fiber 10.

The glass fiber 10 includes a core 12, and a cladding 14 that covers the core 12. The glass fiber 10 is a glass member, and for example, is formed of silica ($SiO_2$) glass. The glass fiber 10 transmits light that is introduced into the optical fiber 1. The core 12, for example, is provided in a region including a central axis line of the glass fiber 10. The core 12, for example, is formed of pure $SiO_2$ glass, or is formed by containing $GeO_2$ and/or a fluorine element, or the like in $SiO_2$ glass. The cladding 14 is provided in a region that surrounds the core 12. The cladding 14 has a refractive index that is lower than a refractive index of the core 12. The cladding 14, for example, is formed of pure $SiO_2$ glass, or $SiO_2$ glass to which a fluorine element is added.

The coating resin layer 20 is an ultraviolet ray curable resin layer that coats the cladding 14. The coating resin layer 20 includes a primary resin layer 22 that coats an outer circumference of the glass fiber 10, and a secondary resin layer 24 that coats an outer circumference of the primary resin layer 22. The primary resin layer 22 is in contact with an outer circumferential surface of the cladding 14, and coats the entire cladding 14. The secondary resin layer 24 is in contact with an outer circumferential surface of the primary resin layer 22, and coats the entire primary resin layer 22. The thickness of the primary resin layer 22, for example, is greater than or equal to 10 and less than or equal to 50 μm. The thickness of the secondary resin layer 24, for example, is greater than or equal to 10 μm and less than or equal to 40 μm. The coating resin layer 20 may further include a colored resin layer that coats the outer circumference of the secondary resin layer 24.

The primary resin layer 22 and the secondary resin layer 24, for example, is formed by curing an ultraviolet ray curable resin composition containing an oligomer, a monomer, and a photopolymerization initiator (a reaction initiator).

Urethane (meth)acrylate, epoxy (meth)acrylate, or a mixed system thereof can be used as the oligomer. A reactant that is obtained by a reaction in a polyol compound, a polyisocyanate compound, and a hydroxyl group-containing (meth)acrylate compound can be used as the urethane (meth)acrylate.

Polytetramethylene glycol, polypropylene glycol, bisphenol A.ethylene oxide-added diol, and the like can be used as the polyol compound. 2,4-tolylene diisocyanate, 2,6-tolylene diisocyanate, isophorone diisocyanate, and the like can be used as the polyisocyanate compound. 2-Hydroxy ethyl (meth)acrylate, 2-hydroxy butyl (meth)acrylate, 1,6-hexanediol mono(meth)acrylate, pentaerythritol tri(meth)acrylate, 2-hydroxy propyl (meth)acrylate, tripropylene glycol di(meth)acrylate, and the like can be used as the hydroxyl group-containing (meth)acrylate compound.

A monofunctional monomer having one polymerizable group and a polyfunctional monomer having two or more polymerizable groups can be used as the monomer. Two or more types of such monomers may be used by being mixed.

Examples of the monofunctional monomer include a (meth)acrylate-based monomer such as methyl (meth)acrylate, ethyl (meth)acrylate, propyl (meth)acrylate, n-butyl (meth)acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethyl hexyl (meth)acrylate, n-octyl (meth)acrylate, isooctyl (meth)acrylate, isodecyl (meth)acrylate, lauryl (meth)acrylate, phenoxy ethyl (meth)acrylate, tetrahydrofurfuryl (meth)acrylate, benzyl (meth)acrylate, dicyclopentenyl (meth)acrylate, dicyclopentenyl oxyethyl (meth)acrylate, dicyclopentanyl (meth)acrylate, nonyl phenol polyethylene glycol (meth)acrylate, nonyl phenoxy polyethylene glycol (meth)acrylate, and isobornyl (meth)acrylate; a carboxyl group-containing monomer such as a (meth)acrylic acid, a (meth)acrylic acid dimer, carboxy ethyl (meth)acrylate, carboxy pentyl (meth)acrylate, and co-carboxy-polycaprolactone (meth)acrylate; heterocyclic ring-containing (meth)acrylate such as 3-(3-pyridyl)propyl (meth)acrylate, N-acryloyl morpholine, N-vinyl pyrrolidone, N-vinyl caprolactam, N-acryloyl piperidine, N-methacryloyl piperidine, and N-acryloyl pyrrolidine; a maleimide-based monomer such as maleimide, N-cyclohexyl maleimide, and N-phenyl maleimide; an N-substituted amide-based monomer such as (meth)acrylamide, N,N-dimethyl (meth)acrylamide, N,N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylol propane (meth)acrylamide; an aminoalkyl (meth)acrylate-based monomer such as aminoethyl (meth)acrylate, aminoethyl (meth)acrylate, N,N-dimethyl aminoethyl (meth)acrylate, and t-butyl aminoethyl (meth)acrylate; and a succinimide-based monomer such as N-(meth)acryloyl oxymethylene succinimide, N-(meth)acryloyl-6-oxyhexamethylene succinimide, and N-(meth)acryloyl-8-oxyoctamethylene succinimide.

Examples of the polyfunctional monomer include such ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of an alkylene oxide adduct of bisphenol A, tetraethylene glycol di(meth)acrylate, hydroxy pivalate neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1,8-octanediol di(meth)acrylate, EO adduct di(meth)acrylate of bisphenol A, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyl oxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylol propane tetra(meth)acrylate, dipentaerythritol tetra(meth)acrylate, dipentaerythritol penta(meth)acrylate, dipentaerythritol hexa(meth)acrylate, and caprolactone modified tris[(meth)acryloyl oxyethyl] isocyanurate.

The photopolymerization initiator can be used by being suitably selected from known radical photopolymerization initiators. Examples of the photopolymerization initiator include 1-hydroxy cyclohexyl phenyl ketone, 2,2-dimethoxy-2-phenyl acetophenone, 1-(4-isopropyl phenyl)-2-hydroxy-2-methyl propan-1-one, bis(2,6-dimethoxy benzoyl)-2,4,4-trimethyl pentyl phosphine oxide, 2-methyl-1-[4-(methyl thio)phenyl]-2-morpholino-propan-1-one (Irgacure 907, manufactured by BASF SE), 2,4,6-trimethyl benzoyl diphenyl phosphine oxide (Irgacure TPO, manufactured by BASF SE), and bis(2,4,6-trimethyl benzoyl)phenyl phosphine oxide (Irgacure 819, manufactured by BASF SE). Two or more types of such photopolymerization initiators may be used by being mixed, and it is preferable that the photopolymerization initiator contains at least 2,4,6-trimethyl benzoyl diphenyl phosphine oxide.

(Method for Manufacturing Optical Fiber)

Figure 2:
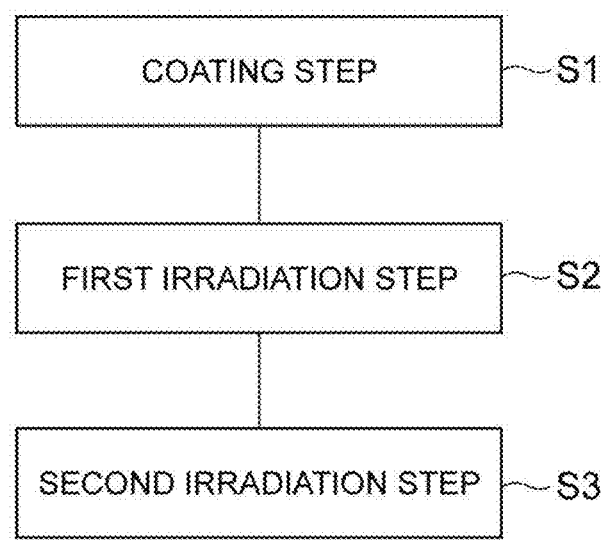
FIG. 2 is a flowchart illustrating a method for manufacturing an optical fiber according to one embodiment.

FIG. 2 is a flowchart illustrating a method for manufacturing an optical fiber according to one embodiment. As illustrated in FIG. 2, a method for manufacturing the optical fiber 1 according to this embodiment includes a coating step S1, a first irradiation step S2, and a second irradiation step S3.

In the coating step S1, first, a first ultraviolet ray curable resin composition is applied onto the surface of the glass fiber 10, and thus, a first layer (a layer corresponding to the primary resin layer 22 after being cured) including the first ultraviolet ray curable resin composition is formed. After that, a second ultraviolet ray curable resin composition is applied onto the surface of the first layer, and thus, a second layer (a layer corresponding to the secondary resin layer 24 after being cured) including the second ultraviolet ray curable resin composition is formed.

In the first irradiation step S2 subsequent to the coating step S1, the first layer and the second layer are cured by irradiating the first layer and the second layer with an ultraviolet ray. Accordingly, the optical fiber 1 including the glass fiber 10, the primary resin layer 22 formed by curing the first layer, and the secondary resin layer 24 formed by curing the second layer is obtained. In the first irradiation step S2, for example, an ultraviolet ray LED and an ultraviolet ray lamp are used as an ultraviolet ray light source. The first irradiation step S2, for example, is performed in an inert gas atmosphere such as a nitrogen atmosphere. An illuminance of an ultraviolet ray in a wavelength range 290 nm to 390 nm (a UVA range and a UVB range), for example, is greater than or equal to 300 mW/cm$^2$ and less than or equal to 1000 mW/cm$^2$. An irradiation time of the ultraviolet ray, for example, is shorter than or equal to 1 second. In the first irradiation step S2, the obtained optical fiber 1 is wound around a first bobbin 31 (refer to FIG. 3).

In the second irradiation step S3 subsequent to the first irradiation step S2, the optical fiber 1 that is obtained in the first irradiation step S2 is irradiated with an ultraviolet ray at an illuminance of less than or equal to one tenth of the illuminance in the first irradiation step S2 for an irradiation time of greater than or equal to ten times the irradiation time in the first irradiation step S2. Accordingly, the optical fiber 1 of which the strength is improved is obtained. In the second irradiation step S3, for example, an ultraviolet ray LED and an ultraviolet ray lamp are used as a ultraviolet ray light source 40 (refer to FIG. 3). The second irradiation step S3, for example, is performed in an air atmosphere. An illuminance of an ultraviolet ray in a wavelength range of 290 nm to 390 nm (a UVA range and a UVB range), for example, is greater than or equal to 100 µW/cm$^2$ and less than or equal to 30 mW/cm$^2$. An irradiation time of the ultraviolet ray, for example, is longer than or equal to 10 seconds and shorter than or equal to 600 seconds. In the second irradiation step S3, for example, the ultraviolet ray light source 40 different from the ultraviolet ray light source (not illustrated) that is used in the first irradiation step S2 is used. Accordingly, for example, the first irradiation step S2 and the second irradiation step S3 can be continuously performed, and thus, it is possible to improve productivity. In addition, for example, the second irradiation step S3 can be performed (or started) before the optical fiber 1 is wound around first bobbin 31 in the first irradiation step S2. Alternatively, the second irradiation step S3 can be performed (or started) when the optical fiber 1 is wound around the first bobbin 31 in the first irradiation step S2. Accordingly, it is possible to further improve the productivity.

FIG. 3 is a schematic view for describing an example of the second irradiation step. The second irradiation step S3, for example, is performed by using a rewinding device 30 as illustrated in FIG. 3. The rewinding device 30 includes the first bobbin 31, a second bobbin 32, and a pair of pulleys 34. The ultraviolet ray light source 40 is attached to be adjacent to each of the bobbins 31 and 32 in such a way that it can emit an ultraviolet ray to the optical fiber 1 wound around each of the bobbins 31 and 32.

As described above, in a stage where a manufacturing process to the first irradiation step S2 is ended, the optical fiber 1 is in a state of being wound around the first bobbin 31. In such a state, it is difficult to irradiate the entire length of the optical fiber 1 with an ultraviolet ray. Therefore, the second irradiation step S3 is performed while the optical fiber 1 is rewound between the first bobbin 31 and the second bobbin 32 by using the rewinding device 30. Accordingly, it is possible to irradiate the entire length of the optical fiber 1 with an ultraviolet ray. In addition, a rewinding rate is adjusted, and thus, it is possible to easily adjust the irradiation time of the ultraviolet ray.

According to Steps S1 to S3 described above, the optical fiber 1 of which the strength is improved is obtained without using a specific resin composition. Herein, the same reference numerals are applied to both optical fibers before and after the strength is improved in the second irradiation step S3.

EXAMPLES

Hereinafter, the present invention will be described in more detail by using examples, but the present invention is not limited to the examples described above.

Example 1

As the coating step, the first layer having a thickness of 32.5 μm was formed on the outer circumference of the glass fiber having a diameter of 125 μm in which the core and the cladding were provided, by using a resin composition for a primary resin layer. The second layer having a thickness of 27.5 μm was formed on the outer circumference of the first layer by using a resin composition for a secondary resin layer. The resin composition for a primary resin layer was prepared by mixing 70 parts by mass of an urethane acrylate oligomer as an oligomer, 27 parts by mass of EO modified nonyl phenol acrylate as a monomer, 2.0 parts by mass of 2,4,6-trimethyl benzoyl diphenyl phosphine oxide as a photopolymerization initiator, and 1.0 parts by mass of 3-mercaptopropyl trimethoxy silane as a silane coupling agent. The resin composition for a secondary resin layer was prepared by mixing 50 parts by mass of urethane acrylate oligomer as an oligomer, 28 parts by mass of epoxy acrylate, 20 parts by mass of isobornyl acrylate as a monomer, and 2.0 parts by mass of 2,4,6-trimethyl benzoyl diphenyl phosphine oxide as a photopolymerization initiator.

Next, as the first irradiation step, the first layer and the second layer were cured by emitting an ultraviolet ray at an illuminance of 300 mW/cm$^2$ for an irradiation time of 0.1 seconds in a nitrogen atmosphere, and thus, the coating resin layer including the primary resin layer and the secondary resin layer was formed. Subsequently, as the second irradiation step, an ultraviolet ray was emitted at an illuminance of 100 μW/cm$^2$ for an irradiation time of 600 seconds in an air atmosphere, and thus, the optical fiber was manufactured. The illuminance of the ultraviolet ray was measured by using an ultraviolet ray intensity meter (a measurement wavelength range of 290 nm to 390 nm (a UVA range and a UVB range)).

Example 2

The optical fiber was manufactured in the same condition as that of Example 1, except that the illuminance of the ultraviolet ray in the second irradiation step was changed to 200 μW/cm$^2$, and the irradiation time was changed to 300 seconds.

Example 3

The optical fiber was manufactured in the same condition as that of Example 1, except that the illuminance of the ultraviolet ray in the second irradiation step was changed to 500 μW/cm$^2$, and the irradiation time was changed to 100 seconds.

Example 4

The optical fiber was manufactured in the same condition as that of Example 1, except that the illuminance of the ultraviolet ray in the second irradiation step was changed to 1000 μW/cm$^2$, and the irradiation time was changed to 30 seconds.

Example 5

The optical fiber was manufactured in the same condition as that of Example 1, except that the illuminance of the ultraviolet ray in the second irradiation step was changed to 30000 μW/cm$^2$, and the irradiation time was changed to 6 seconds.

Example 6

The optical fiber was manufactured in the same condition as that of Example 1, except that the illuminance of the ultraviolet ray in the second irradiation step was changed to 3000 μW/cm$^2$, and the irradiation time was changed to 60 seconds.

Comparative Example 1

The optical fiber was manufactured in the same condition as that of Example 1, except that the illuminance of the ultraviolet ray in the second irradiation step was changed to 100000 μW/cm$^2$, and the irradiation time was changed to 10 seconds.

Comparative Example 2

The optical fiber was manufactured in the same condition as that of Example 1, except that the illuminance of the ultraviolet ray in the second irradiation step was changed to 100 μW/cm$^2$, and the irradiation time was changed to 0.5 seconds.

In the optical fibers of Examples 1 to 6 and Comparative Examples 1 and 2, an increase amount of a glass strength was measured. The increase amount of the glass strength was set to a difference in the glass strength between before the second irradiation step and after the second irradiation step, and was obtained by measuring each of the glass strengths before the second irradiation step and after the second irradiation step. The glass strength was a strength of 50% that is a strength at which half of the optical fiber to be tested fractures, and was measured by performing a tension test with respect to each of the optical fibers to be tested at a tension rate of 25 mm/minute.

Irradiation conditions of the ultraviolet ray in the second irradiation step of Examples 1 to 6 and Comparative Examples 1 and 2, and measurement results of the increase amount of the glass strength in the second irradiation step are shown in Table 1.

TABLE 1

|  | Example 1 | Example 2 | Example 3 | Example 4 | Example 5 | Example 6 | Comparative Example 1 | Comparative Example 2 |
| --- | --- | --- | --- | --- | --- | --- | --- | --- |
| Illuminance (μW/cm$^2$) | 100 | 200 | 500 | 1000 | 30000 | 3000 | 100000 | 100 |
| Time (sec) | 600 | 300 | 100 | 30 | 6 | 60 | 10 | 0.5 |
| Increase amount of glass strength (kgf) | 0.5 | 0.5 | 0.5 | 0.4 | 0.3 | 0.6 | 0 | 0 |

In Examples 1 to 3, all of the glass strengths increased by 0.5 kgf. In Example 4, the glass strength increased by 0.4 kgf. In Example 5, the glass strength increased by 0.3 kgf. In Example 6, the glass strength increased by 0.6 kgf. In contrast, in Comparative Examples 1 and 2, both of the glass strengths did not increase.

What is claimed is:

1. A method for manufacturing an optical fiber including a glass fiber, a primary resin layer that coats an outer circumference of the glass fiber, and a secondary resin layer that coats an outer circumference of the primary resin layer, the method comprising:
    a coating step of forming a first layer by applying a first ultraviolet ray curable resin composition onto the glass fiber, and then, of forming a second layer by applying a second ultraviolet ray curable resin composition onto the first layer;
    a first irradiation step of curing the first layer and the second layer by irradiating the first layer and the second layer with an ultraviolet ray, and of obtaining the optical fiber including the primary resin layer and the secondary resin layer; and
    a second irradiation step of irradiating the optical fiber with an ultraviolet ray at an illuminance of less than or equal to one tenth of an illuminance in the first irradiation step for an irradiation time of longer than or equal to 10 times an irradiation time in the first irradiation step,
    wherein the first irradiation step is performed in an inert gas atmosphere, and
    the second irradiation step is performed in an air atmosphere.

2. The method for manufacturing an optical fiber according to claim 1,
    wherein in the first irradiation step and the second irradiation step, ultraviolet ray light sources different from each other are used.

3. The method for manufacturing an optical fiber according to claim 2,
    wherein in the first irradiation step, the optical fiber that is obtained is wound around a first bobbin, and
    the second irradiation step is performed while the optical fiber is rewound between the first bobbin and a second bobbin.

* * * * *